Nov. 29, 1927.
H. G. GEISSINGER
1,650,623
CONTROL SYSTEM
Filed Jan. 14, 1924 2 Sheets-Sheet 1
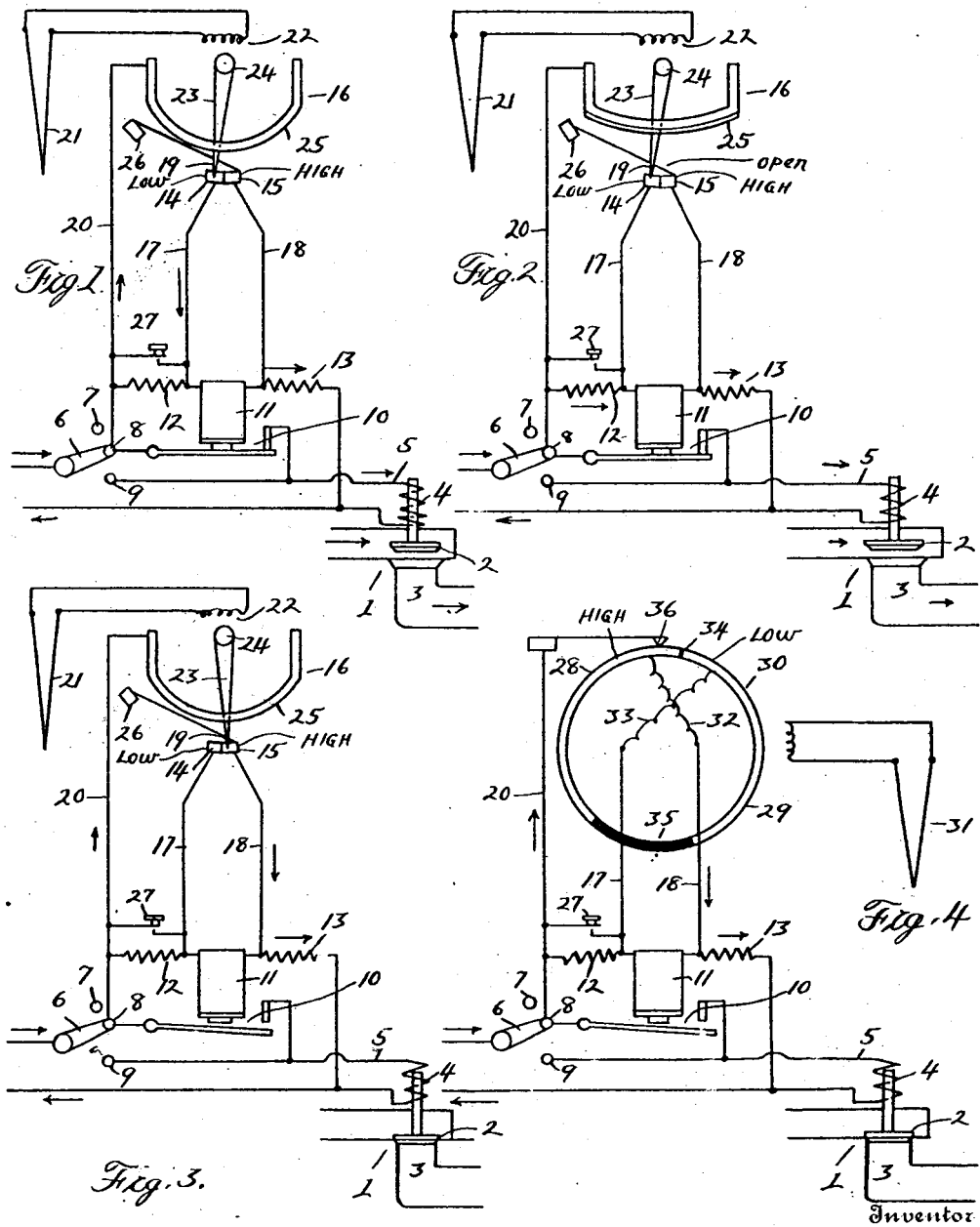
Inventor
Harry G. Geissinger
By Whitmore Hulbert Whitmore Belknap
Attorneys

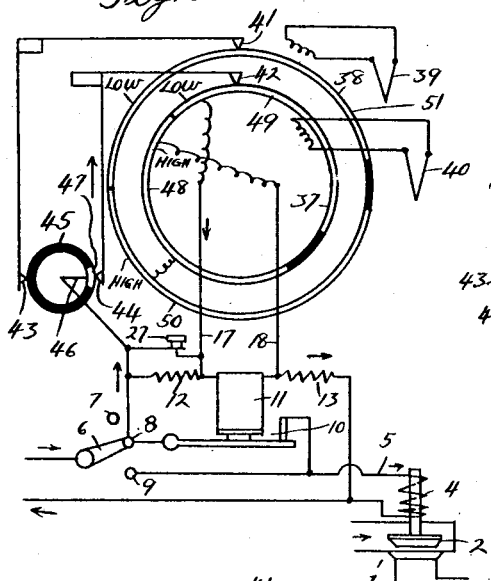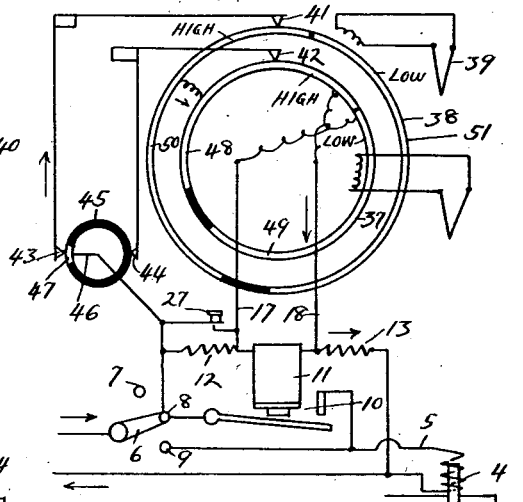

Patented Nov. 29, 1927.

1,650,623

UNITED STATES PATENT OFFICE.

HARRY G. GEISSINGER, OF DETROIT, MICHIGAN.

CONTROL SYSTEM.

Application filed January 14, 1924. Serial No. 686,157.

The invention relates to a system for automatically controlling the temperature in a furnace by automatically regulating the heat input thereinto and consists in a novel method of electrically connecting the standard types of temperature indicating and recording apparatus with other standard types of apparatus for increasing or diminishing the heat supplied to the furnace.

In the present state of the art it is usual to obtain control of gas and oil fired furnaces by means of an automatic valve which has two positions of adjustment, one for supplying excess fuel over that required to maintain the furnace at a predetermined temperature and the other for supplying too little fuel to maintain this condition. A device of this character is usually electro-mechanically operated and is controlled by a relay which in turn is controlled by the position of a movable element in the temperature indicating device. There are two general types of temperature indicating apparatus, viz, the volt meter and the potentiometer, both of which are in commercial use for controlling the signal lamp systems. My invention is applicable to both types of instruments.

One of the objects of the invention is to provide a relay which will automatically open the maximum heat input circuit should the relay fail from any reason such as the interruption of the power circuit or other electrical defect. Relays, which have heretofore been used for this purpose, have been mechanically locked in one of the two positions and if de-energized or defective will remain at last set, leaving the heat input full on or off as may happen. With my apparatus, however, any defect in the operation of the apparatus always places the valve in the position corresponding to the minimum heat input.

Another object of the invention is to obtain an apparatus which may be connected to commercial line voltages and at the same time provide only a small difference of potential when transferring from the high to the low contact.

A further object of the invention is to provide an arrangement which permits manual control of the heat input which is especially important if the instruments are segregated at considerable distance from the furnace.

These and other objects are accomplished by my novel arrangement of circuits hereinafter more fully described.

In the drawings:—

Figures 1 to 3 illustrate the electrical connections of the control system when used with a volt meter type of thermometric instrument, Figure 1 showing the circuit when the "low" contact is closed, Figure 2 showing the circuits with the contacts open, and Figure 3 showing the "high" contact closed;

Figure 4 illustrates the connection when the system is used with a "single point potentiometer" having a mechanically rotated contacting device;

Figures 5 to 8 illustrate the control system as applied to a "two point recorder", the control being effected by two separate thermocouples, one being located in the muffle and the other in the furnace; Figures 5 and 7 show the circuits during the period of muffle temperature indication; Figures 6 and 8 show the circuits when the furnace thermocouple is in control.

In general my system comprises a controlling circuit for the heat input mechanism opened and closed by a relay which is electrically connected to the "high" and "low" contacts upon the thermometric instrument. The relay is normally connected in a circuit of high resistance such as to allow a small current to energize the relay sufficiently to maintain the same in closed position but insufficient to actuate the same from open to closed position. The circuits between the "low" and "high" contacts and the relay are so arranged that when the "low" contact is made, part of the resistance in the circuit is shorted, thereby allowing a large current to pass through the relay which is sufficient to close the same if it happens to be in open position. When the "high" contact is made, the circuits are arranged to shunt around the relay, thereby entirely deenergizing the same and causing it to open the controlling circuit. Thus the relay is always in one of three conditions, first, energized with a strong current, second, energized with a weak current, and third, completely de-energized. The advantage of this system is in its simplicity and in the fact that it allows intermittent contacts to be made by the thermometric instrument while maintaining the control circuit either on or off until such time as the temperature rises or lowers to a predetermined point.

As illustrated in Figure 1 the heat input mechanism 1 is represented as comprising a valve 2 adapted to open and close the passage through a fuel conduit 3 and this valve is controlled by the energization of an electro-magnet 4 in the main circuit 5. A manually operable switch 6 is arranged to control the circuit 5 and has three positions of adjustment corresponding to the contacts 7, 8 and 9. When the switch is placed on the contact 9 the circuit 5 is closed, thus energizing the magnet 4 and opening the valve 2 while moving the switch to contact 7 opens the circuit 5 and thereby closes the valve 2. The third position of the switch 6 is for the purpose of automatic control and thus when the switch arm 6 contacts at 8 the circuit 5 is either opened or closed depending upon the position of the switch 10 actuated by the relay 11.

The relay 11 is normally connected in a circuit including a resistance 12 and a separate resistance 13, these resistances being of such a value that a small current flows through the relay, this current being insufficient to close the relay if in the open position but being sufficient to prevent the opening of the relay if it is in closed position. 14 and 15 are the "low" and "high" contacts respectively of the thermometric instrument 16 and are connected to opposite sides of the relay 11 by conductors 17 and 18. A cooperating contact 19 relatively movable with respect to the "low" and "high" contacts is electrically connected to the resistance 12 by a conductor 20 and is so arranged that when contact is made with the "low" contact as shown in Figure 1 the resistance 12 is short circuited and the relay 11 is energized by a larger current sufficient to close the switch 10, the direction of flow of this current being indicated by the arrows.

Figure 3 illustrates the current flow in the circuits when the "high" contact 15 is engaged by the cooperating contact 19, this arrangement short circuiting both the resistance 12 and the relay 11, thereby opening the switch 10 and breaking the controlling circuit 5.

It has been stated that my control system can be used with different types of thermometric instruments and in Figures 1, 2 and 3 it is shown as being connected to a volt meter type of instrument, this, of course, being shown only diagrammatically in the drawings. As shown, however, 21 indicates a thermocouple suitably connected to a galvanometer coil 22 for rotating the pointer 23 about a pivot 24, the position of the pointer depending upon the temperature of the thermocouple. Instruments of this type are usually provided with a depressor bar 25 which is intermittently actuated by suitable mechanism, not shown, to bear against the pointer 23 and if the pointer is within the range of the contacts 14 and 15 the circuits illustrated in Figures 1 and 3 will be completed. When, however, the depressor bar 25 is not bearing against the pointer 23 neither the resistance 12 nor the relay 11 are short circuited and the current flows through the relay as illustrated in Figure 2 and the relay remains in its last position of adjustment. Figure 2 shows the switch 10 in closed position, therefore indicating that in the last previous operation of the depressor bar the thermometric instrument was upon the low side of a predetermined temperature. It will be understood, of course, that the "low" and "high" contacts are adjustable on the instrument to correspond with any predetermined temperature within the range of the instrument.

In order to insure that the heat input will be a minimum, if for any reason the electrical connections of the thermocouple become broken, there is provided a contact 26 in the path of the pointer 23 corresponding with the zero reading of the instrument. This contact is electrically connected with the "high" contact 15 so that if the pointer assumes the zero position the relay 11 will be short circuited in the same manner as shown in Figure 3 and the control circuit 5 will, therefore, be opened.

Since it is the usual practice in the volt meter type of instruments to make the range of temperature covered by the "low" and "high" contacts quite narrow there is considerable range of temperature below the "low" contact. In order to start the furnace when the instrument is within this temperature range there is provided a starting key 27 which, when depressed, causes the resistance 12 to be short circuited and thus closes the control circuit 5.

In Figure 4 there is illustrated the electrical connections for applying my system to a potentiometer type instrument commonly known as a "single point recorder". This instrument, as diagrammatically illustrated, has "high" and "low" contacts 28 and 29, respectively upon a ring 30 mechanically actuated by suitable mechanism, not shown. It will be understood that the rotative position of the ring is determined by the temperature of the thermocouple 31. The high and low segments are connected to the terminals 18 and 17 by the flexible connections 32 and 33 respectively, while they are insulated from each other at the opposite ends 34 and 35. A cooperating contact point 36 engages the ring and is electrically connected to the terminal 20. In this type of instrument it will be noted that the "high" and "low" contacts are movable, corresponding to the temperature of the thermocouple, while the cooperating contact 36 is stationary but the operation of the heat input mechanism and its controlling circuit 5 is exactly the same as described above with the volt meter type of instrument. It is the custom to separate the extreme ends of the low and high contact rings by a wide insulator as shown at 35 and this insulator ordinarily covers a range of temperature often reached when a heavy load is introduced into a hot furnace. It will be noted, however, that even when the contact 36 bears against the insulator 35 there is still sufficient current through the relay to maintain the same in closed position, thereby allowing the maximum heat input.

In Figures 5 to 8 my system is shown as applied to a "two point recorder" which is sometimes used for indicating the temperature both of the furnace proper and the muffle within which the work is placed. Such instruments are provided with two separate rings such as shown at 37 and 38, each of which is provided with high and low contacting segments insulated from each other. In these drawings 39 represents the thermocouple located in the furnace proper and controls the rotation of the ring 38 while the thermocouple 40 indicates the temperature of the muffle of the furnace and controls the position of the ring 37. 41 and 42 are the cooperating contacts respectively bearing against the rings 38 and 37 and are respectively connected to the brushes 43 and 44, bearing against a commutator ring 45 actuated by suitable timing mechanism, not shown. It will be understood that by the rotation of the commutator ring 45 the rings 37 and 38 are alternately connected to the resistance 12 by means of the conductor 46 and the conducting portion 47 of the commutator ring. The "high" and "low" contacts 48 and 49 of the muffle ring 37 are respectively connected to the terminals 18 and 17. The "high" contact 50 of the furnace ring is connected to the "high" contact 48 of the muffle ring, while the "low" contact 51 of the furnace ring 38 has no other electrical connection.

In Figure 5 the position of the rings 37 and 38 indicate sub-normal temperature of both the furnace and the muffle and since the commutator 45 is shown connecting the muffle ring to the relay circuit it is evident that the resistance 12 will be short circuited as shown by the arrows and the heat input will, therefore, be at the maximum. When the commutator breaks the control of the muffle ring 37 the relay will still remain in the same position due to the small energizing current passing through the resistance 12.

Figure 6 illustrates the circuits when the muffle and the furnace are both above the predetermined temperature and it will be evident that with the commutator 45 connecting either the furnace ring or the muffle ring the relay will be de-energized and the heat input placed at the minimum. In Figures 7 and 8 the muffle temperature is shown too high while the furnace temperature is shown too low and it will be apparent that when the commutator connects the muffle ring as shown in Figure 7 the relay 11 will be entirely de-energized and the heat input will be a minimum. When the commutator connects the furnace ring as shown in Figure 8 the relay is not short circuited but since the energizing current passing through the resistance 12 is too small to actuate the relay 11, the circuit 5 will remain open and the heat input will remain at minimum. This is a desirable arrangement since the muffle temperature should never be allowed to rise to an appreciable extent above the limit set.

It will be understood that the "two point recorder" as diagrammatically illustrated in Figures 5 to 8 is a standard instrument and in order to operate my system for muffle furnace control it is only necessary to connect the high contact segments together and then connect the instrument to the relay as illustrated in the drawings. One other condition of the "two point recorder" should be explained, namely, when the furnace temperature is above the limit set while the muffle temperature is still below the desired range. From Figure 6, it will be apparent that with this condition the relay 11 will be open for half of the time and closed for the other half, this resulting in half-time maximum heat input until the furnace temperature has been reduced or the muffle temperature increased to the desired range. If at any time it is desirable to control the heat input from the muffle temperature alone it will only be necessary to disconnect the contact 41 bearing against the furnace ring 38 and the apparatus will still properly function for the muffle ring.

From the above description it will be apparent that my improved system of furnace control may be applied to various types of thermometric instruments but in all of the various hook-ups one important feature will be noticed, namely, that the heat input mechanism is only adjusted when going from the "high" contact to the "low" contact or vice versa and the intermittent breaking of the contacts has no effect upon the mechanism. Furthermore the system provides means for automatically placing the heat input mechanism in the minimum position if any breakage occurs in the thermocouple connections or if there is any failure in the actuating current from any reason.

What I claim as my invention is:—

1. In a control system, the combination with an electrical control circuit and temperature responsive means, of a relay for opening and closing said control circuit normally connected in a circuit carrying a predetermined current sufficient to maintain said relay in closed position but insufficient to actuate the same, and means for passing a larger or smaller current through said relay dependent upon the position of said temperature responsive means above or below a predetermined temperature.

2. In a control system, the combination with means for controlling the heat input and temperature responsive means, of a relay for actuating said heat input control means normally connected in a circuit including an auxiliary resistance such as to allow an energizing current through said relay insufficient to actuate the same but sufficient to prevent the release thereof, and electrical connections adapted to be completed when said temperature responsive means is above or below a predetermined temperature for increasing or diminishing the amount of current through said relay.

3. In a temperature control system, the combination with temperature responsive means and an electrical control circuit, of a relay for opening and closing said circuit normally connected in a second circuit having an auxiliary resistance such as to cause continuous energization of the relay with a current of relatively low value, and electrical connections between said relay and said temperature responsive means arranged to cause a relatively large current through the relay when the temperature responsive means is on one side of a predetermined temperature and to short circuit said relay when on the opposite side of said temperature.

4. In a temperature control system, the combination with a furnace, a heat input mechanism having maximum and minimum positions of adjustment, and a thermometric instrument having "high" and "low" contacts, of a relay for actuating said heat input mechanism connected to said "high" and "low" contacts to energize said relay upon the making of one contact and de-energize the same upon the making of the other contact, and electrical means for maintaining said relay in the last position of adjustment when neither contact is functioning.

5. In a temperature control system, the combination of a relay for opening and closing an electrical control circuit, a temperature indicating device, cooperating contacts mounted on said device adapted to alternately complete one circuit on one side of a predetermined temperature and another circuit on the opposite side thereof, said circuits being arranged to respectively open and close said relay, and a normally closed circuit including said relay for continuously maintaining an energizing current in said relay when both of the circuits completed by said contacts are inoperative.

6. In a temperature control system, the combination with an electrical control circuit and a temperature responsive means, of a relay adapted to open and close said control circuit, said relay being normally connected in a circuit having an auxiliary resistance such as to slightly energize said relay, means operated by said temperature responsive means when on one side of a predetermined temperature for shunting out said auxiliary resistance to strongly energize said relay, and means operated when on the opposite side of said temperature for shunting out said relay to deenergize the same.

7. In a temperature control system, the combination with a heat input mechanism having maximum and minimum positions of adjustment, and a thermometric instrument having "high" and "low" contacts, of a relay for actuating said heat input mechanism normally connected in a circuit having an auxiliary resistance, electrical connections between said relay and said "low" and "high" contacts adapted to alternately complete circuits for respectively energizing and de-energizing said relay, and a starting switch for energizing said relay when the circuits through said "high" and "low" contacts are inoperative.

8. In a temperature control system, the combination with an electrical control circuit and temperature responsive means, of a relay for opening and closing said control circuit, a manually operable switch adapted to selectively energize said control circuit, de-energize the same and connect said relay in a circuit carrying a predetermined current sufficient to maintain said relay in closed position but insufficient to actuate the same, and means for passing a larger or smaller current through said relay dependent upon the position of said temperature responsive means above or below a predetermined temperature.

9. In a temperature control system, the combination with a furnace, a heat input mechanism having maximum and minimum positions of adjustment, and a thermometric instrument having "high" and "low" contacts to energize said relay upon the making of one contact and de-energize the same upon the making of the other contact, electrical means for maintaining said relay in the last position of adjustment when neither contact is functioning, and a manually operable switch for disconnecting said relay and placing said heat input mechanism in maximum or minimum position according to the position of said switch regardless of the last previous position of adjustment.

10. In a temperature control system, the combination with a furnace, means for regulating the heat input thereof, a pair of thermocouples arranged in different locations in said furnace, and a thermometric instrument having movable members automatically adjustable to correspond to the temperatures of said thermocouples, of control means for said heat input mechanism having a "high"

and a "low" circuit, a contacting device closed by one of said movable members and arranged in said "high" circuit, a second contacting device closed by the other movable member and arranged in said "high" circuit, and a mechanically driven commutator adapted to intermittently complete the "high" circuit through one of said contacting devices when one of said thermocouples is above a predetermined temperature, said commutator also serving to complete said "low" circuit when said thermocouple is below said predetermined temperature.

In testimony whereof I affix my signature.

HARRY G. GEISSINGER.